United States Patent [19]
Caputo et al.

[11] 4,432,439
[45] Feb. 21, 1984

[54] ELEVATOR SYSTEM

[75] Inventors: William R. Caputo, Wyckoff, N.J.;
Masami Nomura, Nagoya, Japan

[73] Assignee: Westinghouse Electric Corp., Pittsburgh, Pa.

[21] Appl. No.: 356,688

[22] Filed: Mar. 10, 1982

[51] Int. Cl.³ .............................................. B66B 1/30
[52] U.S. Cl. ................................................ 187/29 R
[58] Field of Search ......................................... 187/29

[56] References Cited
U.S. PATENT DOCUMENTS

| | | | |
|---|---|---|---|
| 4,124,101 | 11/1978 | Satoh | 187/29 |
| 4,161,235 | 7/1979 | Caputo et al. | 187/29 |
| 4,337,847 | 7/1982 | Schröder et al. | 187/29 |
| 4,351,416 | 9/1982 | Terazono et al. | 187/29 |

Primary Examiner—J. V. Truhe
Assistant Examiner—W. E. Duncanson, Jr.
Attorney, Agent, or Firm—D. R. Lackey

[57] ABSTRACT

An elevator system having an elevator car and a drive system for operating the elevator car. The drive system is forced to adaptively appear to have a desired transfer function in response to a speed pattern signal. In one embodiment, the speed pattern signal is developed by applying the ideal speed pattern, without lag compensation, to a function which provides a response in accordance with the reciprocal of the desired transfer function. In another embodiment, the speed pattern signal is the ideal speed pattern, with lag compensation, and the reciprocal of the desired transfer function is not required.

6 Claims, 11 Drawing Figures

ELEVATOR SYSTEM

BACKGROUND OF THE INVENTION

1. Field of the Invention

The invention relates in general to elevator systems, and more specifically to feedback-controlled elevator systems which include a speed pattern signal.

2. Description of the Prior Art

Feedback-controlled elevator systems use a speed pattern or velocity reference signal which is based on an ideal pattern, but this reference must be modified to compensate for the system time lag or delay $\tau$. Depending upon the configuration of the drive control, the system response will vary to some degree in response to different conditions. This in turn causes the elevator performance to vary.

The lag compensation applied to an elevator system to modify the ideal speed pattern is responsive to the product of the system time delay $\tau$ and the maximum deceleration rate $a_m$. Thus, when the speed pattern signal is modified to change the acceleration, it is also necessary to readjust the lag compensation.

SUMMARY OF THE INVENTION

Briefly, the present invention is a new and improved elevator system which enables the ideal speed pattern to be used, without modification to compensate for system time delay. The transfer function of the elevator system, which varies with different system conditions, is compared with the desired transfer function, and the difference is used as an error signal to force the actual system transfer function to adaptively appear to have the relatively fixed, desired transfer function. The ideal speed pattern is applied to this system through a function which responds according to the reciprocal of the desired transfer function. The net effect is to provide a system which appears to have zero delay, enabling the use of the ideal speed pattern without lag compensation. Since the speed pattern is not modified by lag compensation, the speed pattern and deceleration rate may be changed without the necessity of also adjusting lag compensation. Finally, since the transfer function will not vary appreciably in response to different system conditions, the system performance will be more consistent.

BRIEF DESCRIPTION OF THE DRAWINGS

The invention may be better understood, and further advantages and uses thereof more readily apparent, when considered in view of the following detailed description of the exemplary embodiments, taken with the accompanying drawings in which.

DESCRIPTION OF PREFERRED EMBODIMENTS

Figure 1:
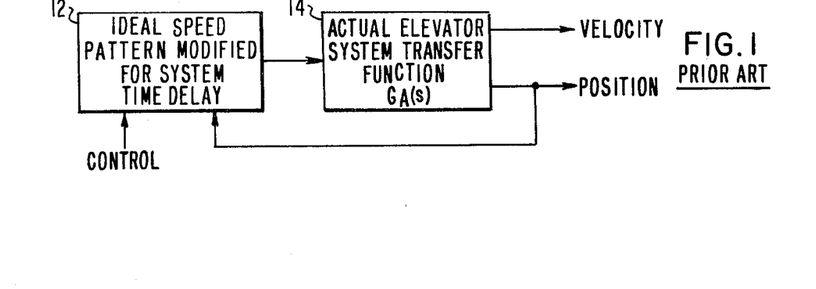
FIG. 1 is a block diagram which illustrates a prior art feedback-controlled elevator system.

Referring now to the drawings, FIG. 1 is a block diagram of a typical prior art closed-loop type of elevator system. A speed pattern generator, represented by block 12, applies a speed pattern to the elevator system whose transfer function $G_A(s)$ is represented by block 14. The speed pattern generator 12 includes a modification of the ideal speed pattern to compensate for system time delay. For example, the slowdown speed pattern, which is a function of car position relative to the floor at which the elevator car is going to stop, may be developed by taking the square root of the distance to go to the stopping point, as set forth in the following relationship:

$$f(x) = \sqrt{2a_m|x - x_f| + \dot{x}_f^2} - \tau a_m \qquad (1)$$

where:

$f(x)$ is the slowdown pattern
$a_m$ is the maximum slowdown rate
$x$ is the car position
$x_f$ is the final car position (the transfer point to the landing device)
$\dot{x}_f$ is the car speed at the transfer point
$\tau$ is the time lag of the system.

It will be noted that the lag compensation is related to the specific maximum deceleration rate chosen, and thus the lag compensation must be changed if the deceleration rate is changed. Thus, as hereinbefore stated, it would be desirable to provide an elevator system which could utilize the ideal speed pattern, without the necessity of modifying it to compensate for system time delay. Then, the ideal velocity reference can be changed without the necessity of readjusting lag compensation. Also, it would be desirable to provide an elevator system whose performance is more consistent. These objectives are achieved by constructing the elevator system according to an embodiment of the invention which is set forth in FIG. 2.

Figure 2:
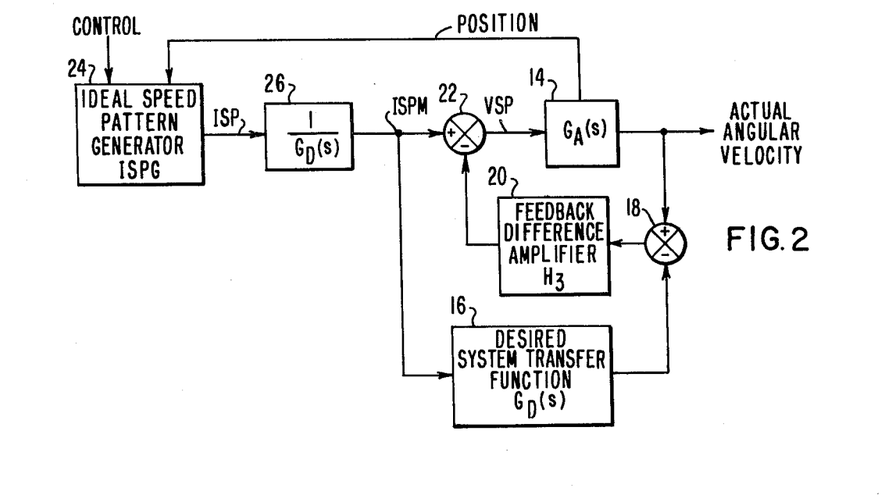
FIG. 2 is a block diagram which illustrates an elevator system constructed according to the teachings of the invention.

FIG. 2 is a block diagram of an elevator system in which the actual drive system transfer function $G_A(s)$ is forced to adaptively appear to have a relatively fixed, desired transfer function $G_D(s)$. This arrangement is then preceded with the reciprocal of the same fixed desired transfer function, i.e., $1/G_D(s)$.

A good approximation of the desired system transfer function of the velocity loop may be represented by the following relatively simple quadratic transfer function, which provides the desired response in the dynamic range of interest:

$$G_D(s) = \frac{K}{\frac{s^2}{\omega_o^2} + \frac{2p}{\omega_o}s + 1} \qquad (2)$$

More specifically, the response of the desired system transfer function $G_D(s)$, represented by block 16, is compared with the response of the actual elevator system transfer function $G_A(s)$ in summing junction 18. The difference is applied to a feedback difference amplifier H3, represented by block 20. Amplifier 20 is a stabilized amplifier set for the minimum gain required to achieve the overall desired system transfer function. The output of amplifier 20 is the error between the actual and desired system responses, and it is applied as one input to a summing junction 22.

The ideal speed pattern, without lag compensation, which is provided by a generator represented by block 24, is applied to the summing junction 22 via a function shown at block 26. This function has a transfer function which is the reciprocal of the desired system transfer function, i.e., $1/G_D(s)$. While the true reciprocal is intended, in actuality it will not be a true reciprocal as signal limiting and noise rejection will be incorporated into function 26. Equation (3) sets forth the reciprocal of $G_D(s)$ without signal limiting and noise rejection. This transfer function would be modified by the transfer functions of the band-pass filtering used.

$$\frac{1}{G_D(s)} = \frac{s^2}{K\omega_o^2} + \frac{2ps}{K\omega_o} + \frac{1}{K} \qquad (3)$$

The net effect of the arrangement shown in FIG. 2 is to provide a system which appears to have zero delay, and thus the ideal speed pattern may be used without lag compensation. Since the ideal speed pattern is used, the acceleration rate represented by the pattern may be easily changed, as there is no lag compensation to be readjusted. Also, since the system response is close to the desired response, the performance of the elevator system will be more consistent as it will follow the relatively fixed, desired transfer function.

Since the elevator system response will closely follow the input, slight irregularities in the pattern, which are not a problem with a normal elevator system, will be followed. Thus, irregularities in the pattern will be reflected into the ride quality of the elevator system. To achieve a smooth ride, a smooth speed pattern is required.

Figure 3:
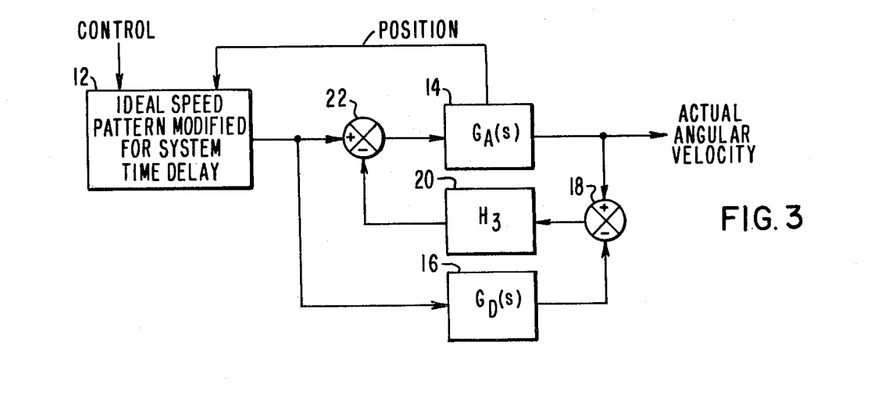
FIG. 3 is a block diagram which illustrates another embodiment of the invention.

FIG. 3 is a block diagram of an elevator system constructed according to another embodiment of the invention, which may be used when a smooth speed pattern cannot be assured. The block diagram of FIG. 3 is similar to that of FIG. 2 in that the transfer function of the elevator drive system is forced to adaptively appear to have a desired transfer function. The system of FIG. 3, however utilizes an ideal speed pattern generator modified for system time delay, as in FIG. 1, and function 26 shown in FIG. 2 is eliminated.

Figure 4:
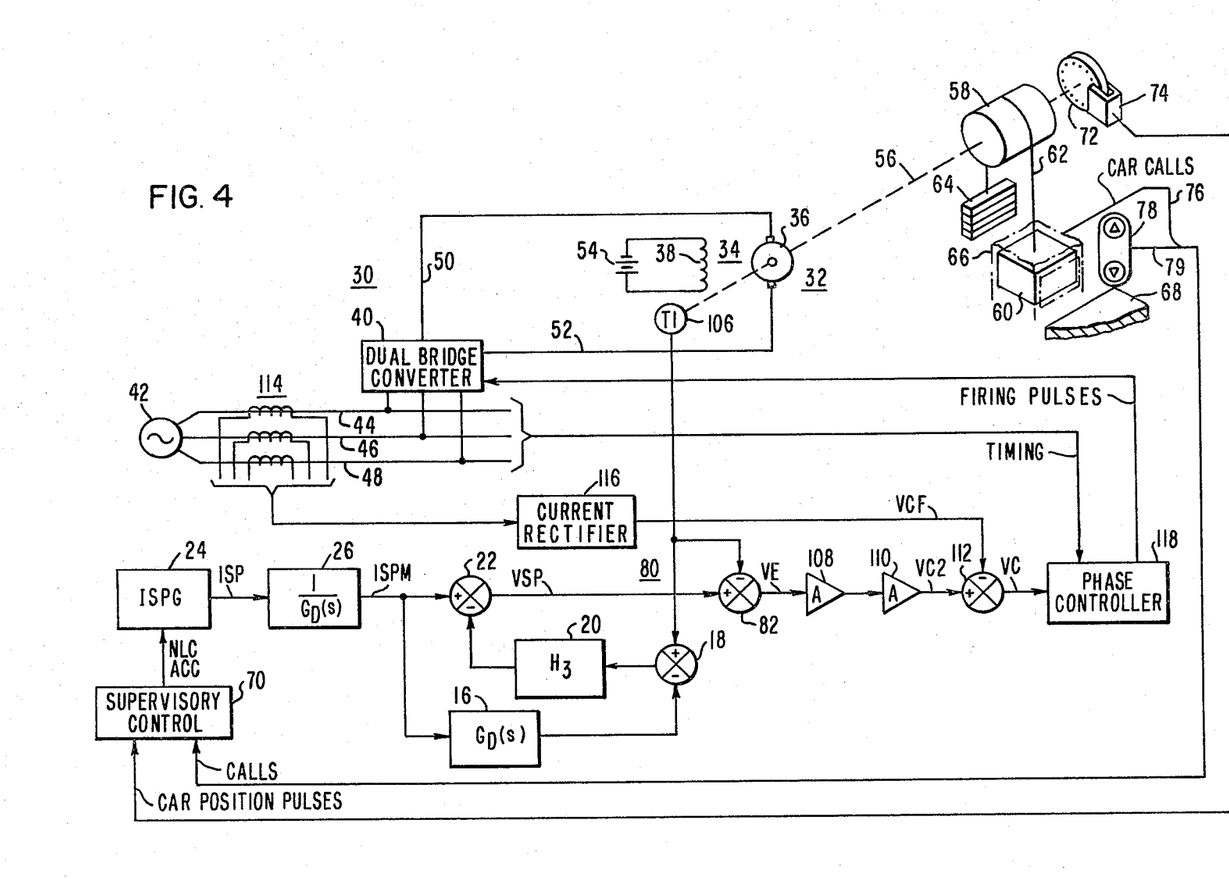
FIG. 4 is a schematic diagram of an elevator system constructed according to the teachings of the invention.

FIG. 4 is a schematic diagram of an elevator system 30 constructed according to the embodiment of FIG. 2, with like functions in FIGS. 2 and 4 being identified with like reference numerals. Elevator system 30 includes a drive machine 30, which may have an A.C. or a D.C. drive motor. For purposes of example, the drive machine 32 is illustrated with a direct current drive motor 34 having an armature 36 and a field winding 38. The armature 36 is electrically connected to an adjustable source of direct current potential. The source of potential may be a direct current generator of a motor generator set in which the field current of the generator is controlled to provide the desired magnitude of unidirectional potential, or as shown in FIG. 4, the source of direct current potential may be a static source, such as a dual converter 40. The dual converter 40 is shown for purposes of example, as its quick response is ideally suited for the velocity control loop of the present invention.

Dual converter 40 includes first and second converter banks, which may be three-phase, full-wave bridge rectifiers connected in parallel opposition. Each converter includes a plurality of static-controlled rectifier devices connected to interchange electrical power between alternating and direct current circuits. The alternating current circuit includes a source 42 of alternating potential and busses 44, 46 and 48; and, the direct current circuit includes busses 50 and 52, to which the armature 36 of the direct current motor 34 is connected. The dual bridge converter enables the magnitude of the direct current voltage applied to armature 36 to be adjusted, by controlling the conduction or firing angle of the controlled rectifier devices, and it allows the direction of the direct current flow to the armature to be reversed when desired, by selectively operating the converter banks. Dual converter apparatus which may be used is shown in detail in U.S. Pat. Nos. 3,713,011 and 3,713,012, which are assigned to the same assignee as the present application.

The field winding 38 of drive motor 34 is connected to a source 54 of direct current voltage, represented by a battery in FIG. 4, but any suitable source, such as a single bridge converter may be used.

The drive motor 34 includes a drive shaft, indicated generally by broken line 56, to which a traction sheave 58 is secured. An elevator car 60 is supported by a plurality of wire ropes 62 which are reeved over the traction sheave 58. The other ends of the ropes 62 are connected to a counterweight 64. The elevator car is disposed in a hoistway 66 of a structure having a plurality of floors or landings, such as floor 68, which are served by the elevator car 60.

The position of the elevator car 60 in the structure or building may be determined by any suitable means, such as by a floor selector, shown generally as supervisory cotrol 70, and by a pulse wheel 72 which is rotated in response to car movement. A pickup 74 translates movement of the pulse wheel into pulses which may be used to increment or decrement a reversible car position counter in control 70. U.S. Pat. No. 3,750,850, which is assigned to the same assignee as the present application, discloses such an incremental count car position arrangement in detail.

Car calls placed on a suitable car station (not shown) in the elevator car 60, are shown generally as being transmitted over a conductor 76 to control 70, and the halls calls, placed at the various floors, such as via the hall call push button arrangement 78, are transmitted to control 70 via a conductor 79.

The supervisory control 70 provides pulses NLC to the ideal speed pattern generator 24, which pulses are used by the speed pattern generator to generate the speed pattern ISP. The speed pattern generator set forth in U.S. Pat. No. 3,747,710, which is assigned to the same assignee as the present application, may be used. However, the adjustable lag compensation for accommodating different deceleration rates, following the square root function, would not be used. The signal ACC is also provided by the supervisory control 70 to the speed pattern generator 24, in order to initiate acceleration and deceleration at the appropriate times.

The movement mode of the elevator car 60 and its position in the hoistway 66 are controlled by the voltage magnitude applied to the armature 36 of the drive motor 34. The magnitude of the direct current voltage applied to armature 36 is responsive to a velocity command signal ISP provided by the speed pattern generator 24. A servo control loop 80 for controlling the speed, and thus the position of the elevator car 60 in response to the velocity command signal ISP is constructed according to the teachings of the invention.

In order to simplify control loop 80, only motor current and velocity feedback loops are illustrated. Other feedback loops, such as an acceleration feedback loop, may be included.

The transfer function forcing arrangement of FIG. 2 is applied between the ideal speed pattern generator 24 and a summing junction 82. The desired transfer function $G_D(s)$ in block 16 may be developed by microprocessor, or by operational amplifiers. An operational amplifier circuit which may be used is shown in FIG. 5.

Figure 5:
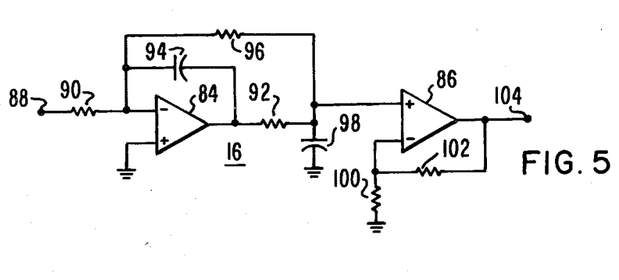
FIG. 5 is a schematic diagram of a circuit which may be used to provide the desired elevator system transfer function.

More specifically, the circuit of FIG. 5, which functions according to equation (2), includes first and second operational amplifiers (op amps) 84 and 86, respectively, with the input terminal 88 of this circuit being connected to the inverting input of op amp 84 via a resistor 90. The output of op amp 84 is connected to the non-inverting input of op amp 86 via a resistor 92. The non-inverting input of op amp 84 is connected to ground. A capacitor 94 is connected from its inverting input to its output, and a resistor 96 is connected from its inverting input to the non-inverting input of op amp 86. A capacitor 98 is connected from the non-inverting input of op amp 86 to ground, and its inverting input is connected to ground via a resistor 100. A resistor 102 interconnects its output with its inverting input, and the output of function 16 appears at output terminal 104. Using a K of 1, a $\rho$ of 0.4, and an $\omega_o$ of 10 in equation (2), the following values were used in a computer simulation to simulate the desired transfer function $G_D(s)$:

Resistor 90—80K ohms
Resistors 92, 96, 100 and 102—40K ohms each
Capacitor 94—1 $\mu$F
Capacitor 98—6.25 $\mu$F.

These values are submitted for purposes of example, in order to illustrate typical values for the specific design parameters selected for the gain K, $\rho$ and $\omega_o$.

The actual angular velocity of the drive motor 34 may be developed by a tachometer T1, referenced 106, with the actual angular velocity being referred to as signal VT1. Signal VT1 provides the input to summing junction 18 in the forcing loop, and it also provides a velocity feedback signal for comparison with the speed pattern signal VSP in summing junction 82. Amplifier 108 conditions the error signal VE, which is obtained from the comparison in summing junction 82, with such conditioning essentially involving integration of the error signal. An amplifier 110 conditions signal VE to provide a signal VC2 suitable for use as a current reference for comparison with a signal VCF in a summing junction 112. Signal VCF is responsive to actual motor current, and it may be provided by current transformers 114 which measure the current in conductors 44, 46 and 48, and by a current rectifier 116. The current reference is described in greater detail in the hereinbefore-mentioned U.S. Pat. Nos. 3,713,011 and 3,713,012.

The output signal VC from the summing junction 112 is applied to a phase controller 118. Phase controller 118, with the aid of timing waveforms from the A.C. circuit, provides appropriate firing pulses for the controlled rectifier devices of the dual bridge converter 40. The firing pulses are timed to cause the drive motor 34 to follow the speed pattern signal VSP and operate the elevator car 60 to serve calls for elevator service.

Figure 6:
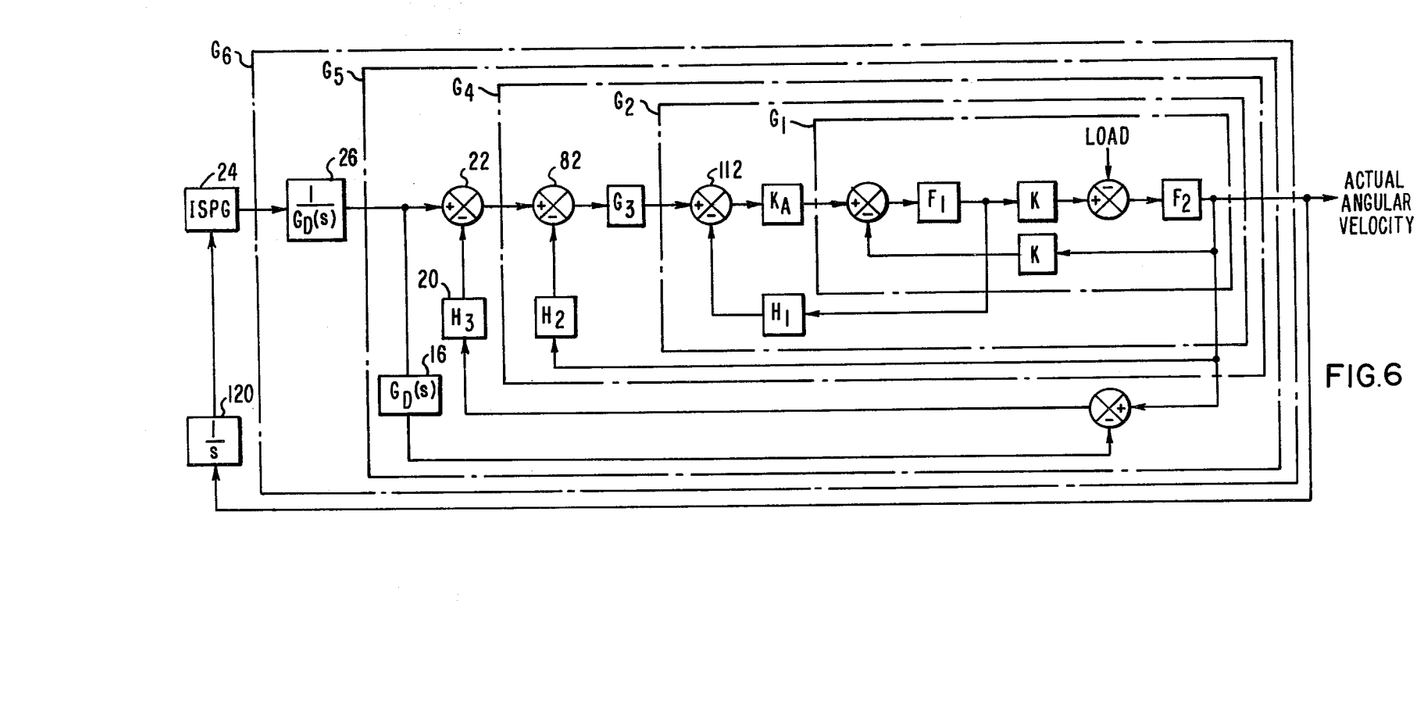
FIG. 6 is a detailed block diagram of the elevator system shown in FIG. 4.

FIG. 6 is a detailed block diagram which illustrates the various transfer functions of the elevator system shown in FIG. 4, with the various transfer functions being simulated on a computer to illustrate how the performance of an elevator system can be improved by utilizing the teachings of the invention. Transfer function $G_1$ represents the drive motor 34 with CEMF feedback and the elevator mechanical system. Transfer function $G_2$ represents the addition of the solid-state motor drive or dual converter 40 to the system, with function $H_1$ indicating the transfer function of the current feedback loop. Transfer function $G_3$ represents the transfer function of the remaining portion of the velocity loop of the typical elevator system, and transfer function $G_4$ represents the transfer function of the actual elevator system, including the elements of function $G_3$ and velocity feedback, represented by the transfer function $H_2$. Thus, transfer function $G_4$ is analogous to the transfer function $G_A(s)$ used in the earlier figures. Transfer function $G_5$ represents the desired system transfer function, with the addition of blocks 16 and 20, and summing junction 22. Transfer function $G_6$ represents the transfer function of the overall improved elevator system, after the introduction of function 26. Block 1/s, referenced 120, represents the position feedback.

Figure 7:
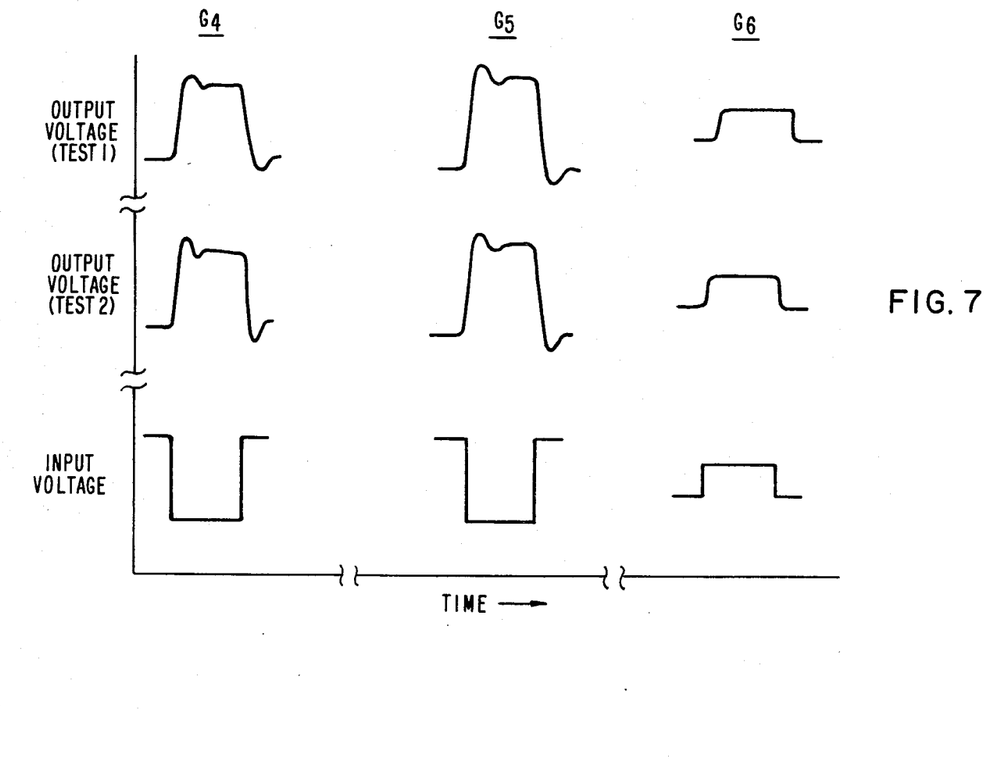
FIG. 7 is a graph which illustrates the step responses of selected transfer functions of a simulated elevator system represented by the block diagram of FIG. 6.

FIG. 7 is a graph which illustrates the step responses of functions $G_4$, $G_5$ and $G_6$ for a laboratory working model. Two tests on each function were performed, with test 2 having different adjustments on function $G_4$ than on test 1. Function $G_4$ had a different response on each test, with a 13% overshoot on test 1 and a 20% overshoot on test 2. Function $G_5$ had the same result on each test, but had about a 17% overshoot. The tests on function $G_6$, which simulate an elevator system constructed according to the teachings of the invention, had the same quick response on each test, and an overshoot of only about 2 to 3%.

Figure 8:
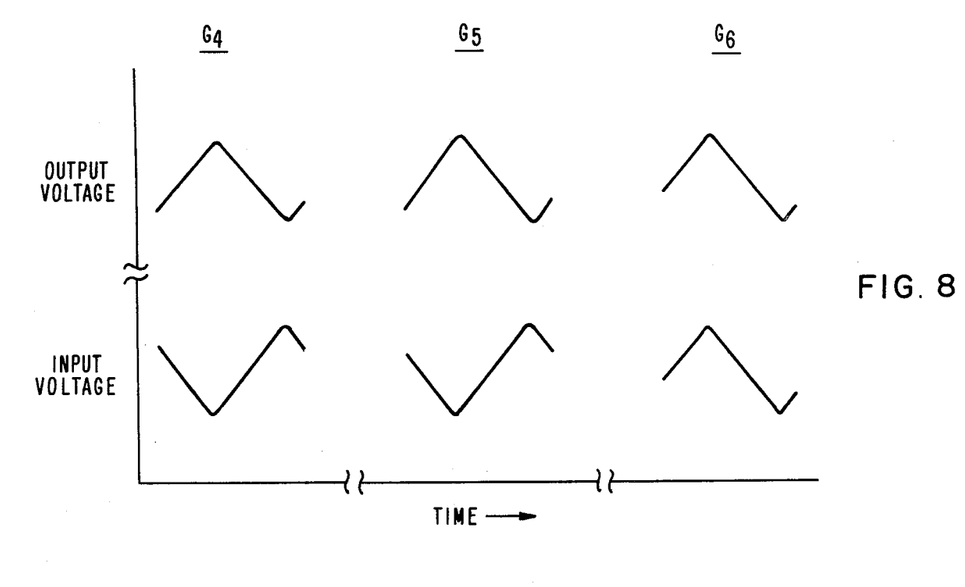
FIG. 8 is a graph which illustrates the ramp responses of the selected transfer functions.

FIG. 8 is a graph which illustrates the ramp responses of functions $G_4$, $G_5$ and $G_6$. The responses using function $G_4$ had a delay of 0.29 sec for the adjustments of test 1 and a delay of 0.15 sec for the adjustments of test 2. Function $G_5$ had the same delay of 0.26 sec for the adjustments of test 1 and test 2, showing the forcing to the desired response. Function $G_6$ had a very short time delay of 0.0126 sec for both tests 1 and 2. This is more accurately shown by the method shown in FIG. 9.

Figure 9:
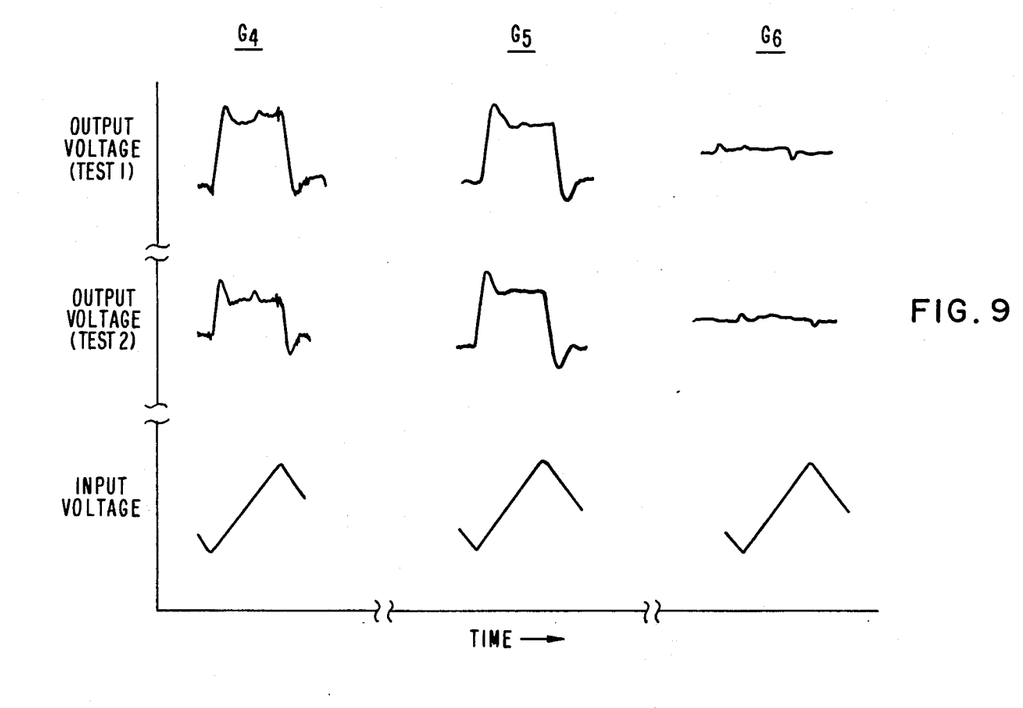
FIG. 9 is a graph which illustrates the delay of the selected transfer functions to a ramp input.

FIG. 9 is a graph which illustrates the test results of delay on ramp input. The voltage input was Kt, and the voltage output was K $(t-T_o)$, with $T_o$ being the delay time on ramp input. The results show different delay times for two different tests on function $G_4$. Function $G_5$ had about the same delay for both tests, and function $G_6$ had the same very small delay on each test.

Figure 10:
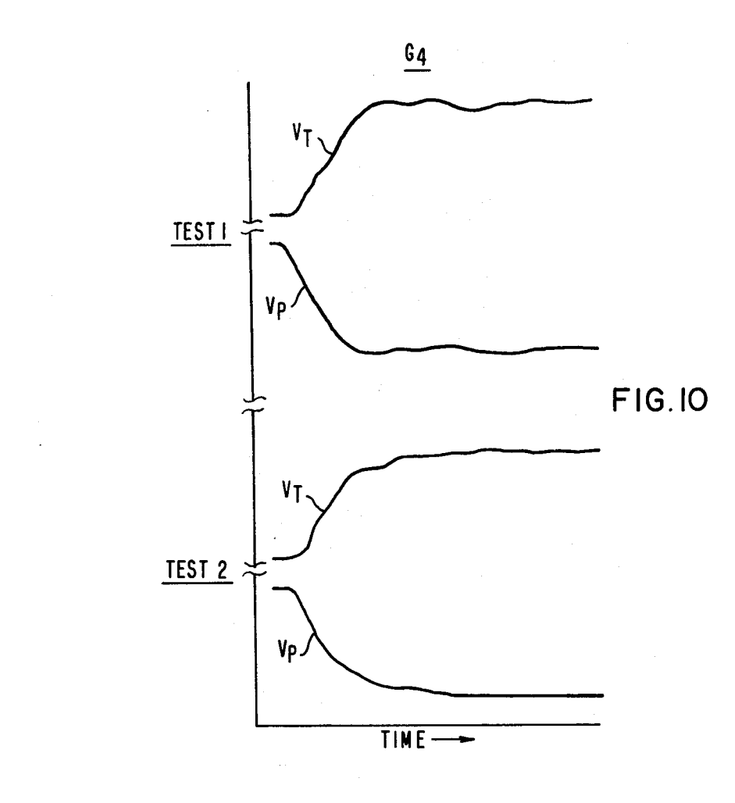
FIG. 10 is a graph which illustrates the landing characteristic of a simulated elevator system using a selected transfer function of FIG. 6.

FIG. 10 is a graph which illustrates the landing characteristic of an elevator simulation using function $G_4$ and position feedback. Signal $V_T$ is the output (velocity) and signal $V_P$ is the input (speed pattern). It will be noted that the landing characteristics are different in the two tests. The two tests used the same adjustments as in test 1 and test 2 of FIGS. 7, 8 and 9.

Figure 11:
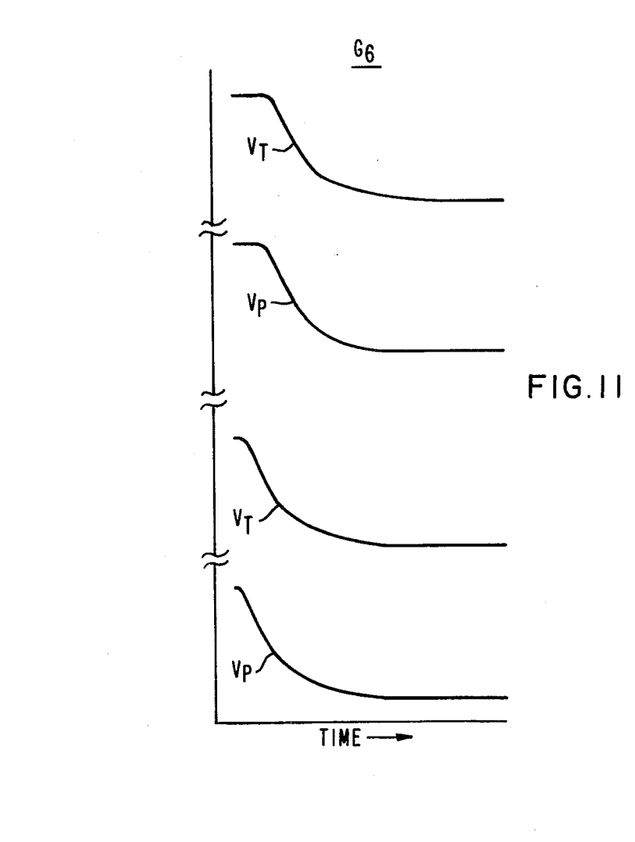
FIG. 11 is a graph which illustrates the landing characteristic of a simulated elevator system using the transfer function of an elevator system constructed according to the teachings of the invention.

FIG. 11 is a graph which illustrates the landing characteristic of an elevator simulation using function $G_6$ and position feedback. It will be noted that not only are the landing characteristics similar, but that the configuration of $V_T$ is almost the same as the configuration of $V_P$, unlike the simulation performed on function $G_4$ shown in FIG. 10.

In summary, there has been disclosed a new and improved elevator system which provides a more consistent performance with varying system conditions, and one which will more closely follow a speed pattern. Since the disclosed elevator system appears to have zero time delay, the speed pattern need not be modified with lag compensation, and this simplifies changing the speed pattern, as there is no lag compensation to readjust for each change of acceleration rate.

We claim as our invention:

1. An elevator system, comprising:
   an elevator car,
   speed pattern means providing a speed pattern signal,
   a drive system for said elevator car which provides a first output signal in response to said speed pattern signal in accordance with a predetermined actual transfer function,
   first means providing a second output signal in response to said speed pattern signal in accordance with a predetermined desired transfer function,
   and second means responsive to said first and second output signals for forcing the drive system to adaptively appear to have said predetermined desired transfer function.

2. The elevator drive system of claim 1 wherein the speed pattern means includes means providing an ideal speed pattern signal without lag compensation, and means providing a third output signal responsive to said ideal speed pattern signal in accordance with the reciprocal of the predetermined desired transfer function, with said third output signal being the speed pattern signal provided by the speed pattern means.

3. The elevator system of claim 1 wherein the speed pattern signal provided by said speed pattern means is the ideal speed pattern signal with lag compensation.

4. The elevator system of claim 1 wherein the second means includes comparator means which provides an error signal in response to the difference between the first and second output signals, with said error signal modifying the speed pattern signal applied to the drive system.

5. The elevator system of claim 2 wherein the second means includes comparator means which provides an error signal in response to the difference between the first and second output signals, with said error signal modifying the speed pattern signal applied to the drive system.

6. The elevator system of claim 3 wherein the second means includes comparator means which provides an error signal in response to the difference between the first and second output signals, with said error signal modifying the speed pattern signal applied to the drive system.

* * * * *